Sept. 12, 1939.                     L. W. WATERS                        2,172,488
                                   WINSHIELD WIPER
                                Filed Feb. 28, 1938           2 Sheets-Sheet 1

INVENTOR.
Lawrence W. Waters,
BY
Alan Franklin
ATTORNEY.

Sept. 12, 1939.  L. W. WATERS  2,172,488
WINSHIELD WIPER
Filed Feb. 28, 1938   2 Sheets-Sheet 2
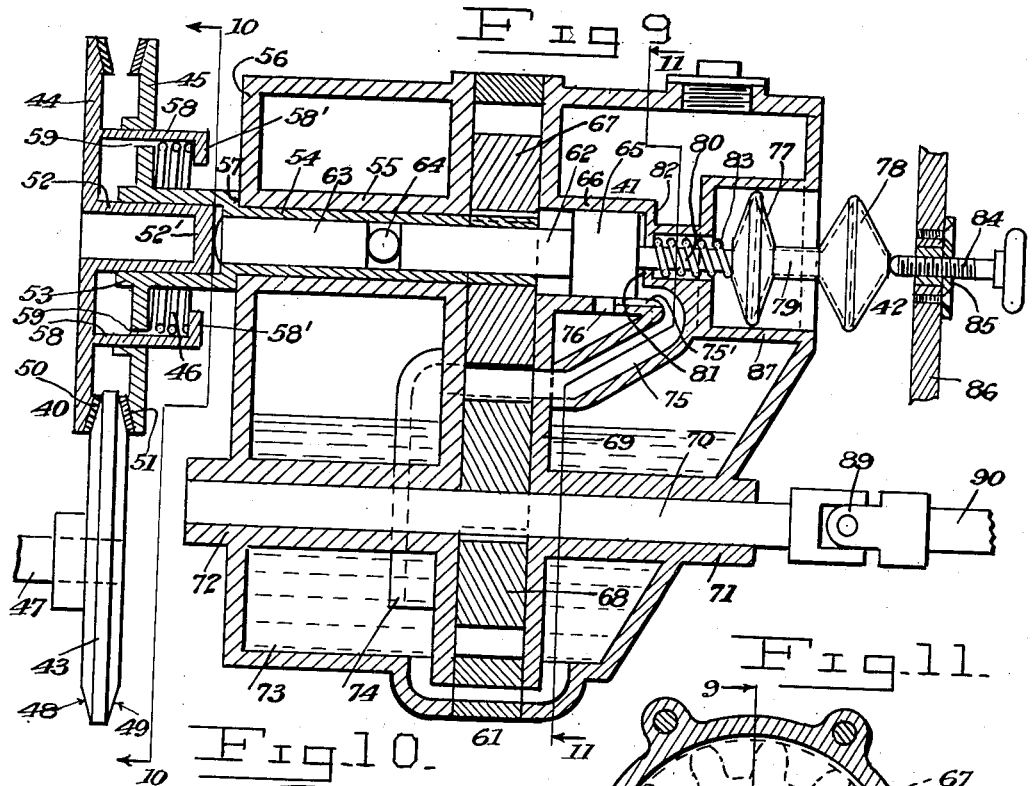
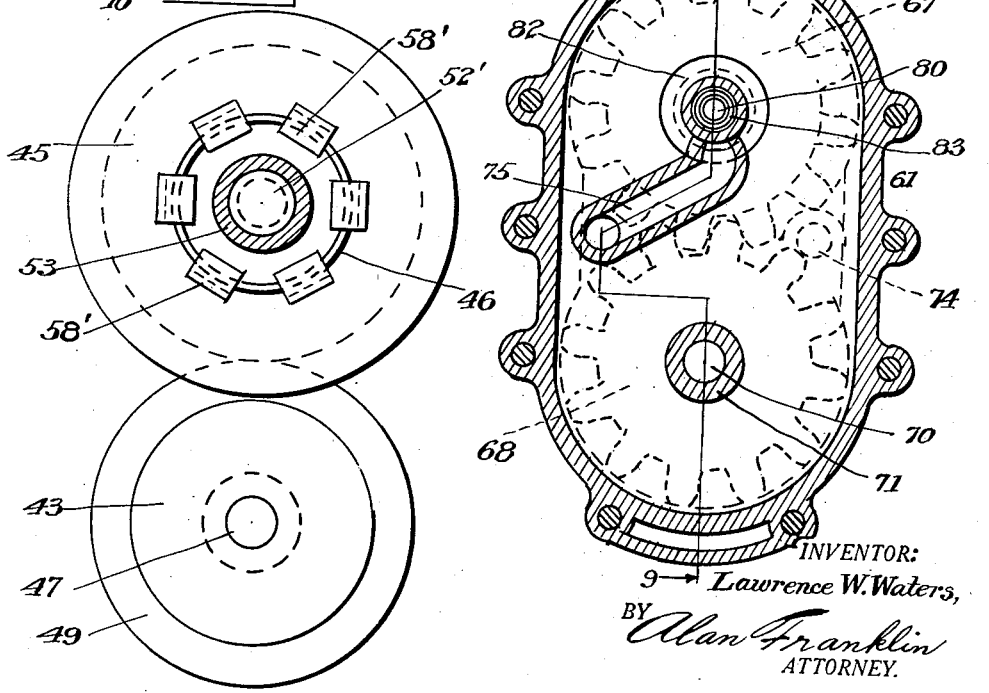
INVENTOR:
Lawrence W. Waters,
BY Alan Franklin
ATTORNEY.

Patented Sept. 12, 1939

2,172,488

UNITED STATES PATENT OFFICE 2,172,488

WINDSHIELD WIPER

Lawrence W. Waters, Los Angeles, Calif.

Application February 28, 1938, Serial No. 193,095

1 Claim. (Cl. 15—253)

This invention relates to windshield wipers for motor vehicles.

One of the objects of the invention is to provide a windshield wiper which will wipe practically the entire surface of the windshield of an automobile.

Another object is to provide a windshield wiper of the character stated which is operated by a crankshaft rotating in one direction.

A further object is to provide a windshield wiper with a speed regulator and governor.

Other objects and advantages will appear hereinafter.

The invention is illustrated in the annexed drawings which form a part of this specification and in which:

Fig. 1 is a fragmentary front view of an automobile with my invention applied thereto for wiping the windshield of the automobile.

Fig. 2 is a horizontal section of Fig. 1 taken on line 2—2 of Fig. 1.

Fig. 3 is a side view of one of my wiper members and the arm on which said wiper member is mounted.

Fig. 4 is a front view of one of the spring cranks for actuating one of the wiper members, the crank being partly broken away to show its spring.

Fig. 5 is a horizontal section of said spring crank taken on line 5—5 of Fig. 4.

Fig. 6 is a horizontal section taken on line 6—6 of Fig. 1 showing the crankshaft and double crank for operating the two wiper units of my windshield wiper.

Fig. 7 is a vertical section taken on line 7—7 of Fig. 2 showing one of the wiper actuating arms and guide means for said arm.

Fig. 8 is a horizontal section taken on line 8—8 of Fig. 7.

Fig. 9 is a vertical longitudinal section of the speed regulator and governor of my windshield wiper.

Fig. 10 is a transverse vertical section taken on line 10—10 of Fig. 9.

Fig. 11 is a transverse vertical section taken on line 11—11 of Fig. 9.

Referring more particularly to the drawings, in which corresponding parts are designated by the same reference characters in all of the views, 1 and 2 indicate a pair of wiper units, the unit 1 being mounted on an automobile 3 for wiping the left panel 4 of the windshield 5, and the unit 2 being mounted on the automobile for wiping the right panel 6 of said windshield.

Each wiper unit 1 and 2 includes a wiper bar 7, an actuating rod 8, to one end of which is connected a bracket 7' carrying said wiper bar, a spring crank 9 connected to the other end of said actuating rod, and a guide 10 for said actuating rod. Each spring crank 9 comprises a drum 11 formed with a crank arm 12, said drum being formed with bearings 13 and 14 in its rear and front walls respectively, through which bearings extends a stud journal 15 secured at its rear end in the transverse wall 16 of the automobile 3 by a nut 17, whereby the crank 7 is journaled on said stud journal. Within the crank drum 11 is a coil spring 18 which is coiled around the journal 15 and is secured at the inner end at 19 to said journal and at its outer end at 20 to the cylindrical wall 21 of said drum 11. Each guide 10 comprises a fulcrum disk 22, formed with a stud shaft 23 journaled in the rear wall of a housing 24, and a pair of suitably spaced concaved rollers 25 journaled on said disk, between which rollers extends a wiper-actuating rod 8, said rod being formed with an ogee bend 26, which, while passing between said rollers causes the fulcrum disc 22 to turn on its pivot stud 23 and act as a fulcrum on which the wiper bar 7 is swung upwardly from its horizontal position at the lower edge of the windshield into its vertical position, in which position said wiper bar is guided horizontally by the engagement of straight portion 27 of the actuating rod with the guide rollers 25.

In the transverse wall 16 of the automobile is secured a bearing 28 in which is journaled a crankshaft 29, on the forward end of which is secured a double crank 30 formed with a pair of crank arms 31 and 32 and a pair of crank pins 33 and 34 disposed diametrically opposite each other, the arms 31 and 32 being connected by the crankpin 33. To the crankpin 33 is secured one end of a steel strap 35, which extends over the periphery of the drum 11 of the spring crank 7 of the wiper unit 1, and is secured at its other end to said drum. To the crankpin 34 is secured one end of a steel strap 36, which extends over the periphery of the drum 11 of the spring crank 7 of the wiper unit 2, and is secured at its other end to said drum.

My speed regulator and governor is illustrated in Figs. 9 to 11 of the drawings and includes generally a spring clutch 40, automatic hydraulic governor 41, and a manually-operated speed regulator 42.

The clutch 40 comprises a friction wheel 43 and a pair of friction gripping disks 44 and 45 which are normally held in frictional gripping engagement with the wheel 43 by a coil spring 46. The friction wheel 43 is secured on the generator shaft 47 of the automobile 3, and is formed on opposite sides with a pair of beveled friction faces 48 and 55

49 to be gripped respectively by a pair of beveled gripping surfaces 50 and 51 on the inner sides of the gripping disks 44 and 45 respectively. The gripping disk 44 is formed with a hub 52 which telescopes within a tubular hub 53 formed on the gripping disk 45 and on the outer end of a tubular clutch shaft 54, which is journaled in a bearing 55 in a casing 56, the inner end of the hub 53 forming an external shoulder 57 from the shaft 54, and engaging the adjacent end of said casing 56 to provide an end thrust bearing for the gripping disk 45. The gripping disk 44 is formed with a plurality of inwardly-extending shanks 58, which extend through openings 59 in the gripping disk 45 and are formed with inturned flanges 58' on their inner ends. The expansion coil spring 46 surrounds the hub 53 of the gripping-disk 45 and bears at its ends respectively against the outer side of said gripping disk and the inner side of said shank flanges 58' for drawing the gripping disk 44 toward the gripping disk 45 for gripping the friction wheel 43 between said disks.

The automatic hydraulic governor 41 comprises an oil pump 61, a hydraulic plunger 62, and an auxiliary plunger 63, said pump being mounted in the casing 56, and said plungers being slidably journaled in the tubular clutch shaft 54, there being an end-thrust ball bearing 64 interposed between the adjacent ends of said plunger 62 and said auxiliary plunger 63, and the outer end of said auxiliary plunger bearing against the inner end 52' of the hub 52 of the gripping disk 44. On the outer end of the plunger 62 is a piston 65 operatively mounted in a cylinder 66 in the casing 56. The oil pump 61 is a gear pump comprising a pair of intermeshing gears 67 and 68, mounted within a pump casing 69 forming part of the casing 56, the gear 67 being secured on the inner end of the clutch shaft 54, and the gear 68 being secured on a drive shaft 70 journaled in bearings 71 and 72 in the casing 56. The casing 56 is formed with an oil reservoir 73 and an oil inlet tube 74 leads from the bottom of said reservoir into the pump casing 69 at a point at one side of the pump gears 67 and 68 opposite the intermeshing teeth of said gears. From the other side of the pump gears opposite their intermeshing teeth leads an outlet tube 75 into the outer end of the cylinder 66, which cylinder is provided with an outlet 76 intermediate its ends, there being a groove 75' formed in the lower wall of the cylinder 66 leading from the end of the outlet tube 75 into the outlet 76.

The manually-operated speed regulator 42 includes a pair of expansible and contractible receptacles 77 and 78, connected together at their adjacent sides by a tube 79; a stem 80, connected to the inner side of the receptacle 77 and slidably extending through a bearing 81, in the outer end wall 82 of the cylinder 66; a coil spring 83 surrounding said stem 80; and a regulating screw 84 threaded in a bearing 85 in the dash 86 of the automobile 3. The spring 83 bears at its ends respectively against said end cylinder wall 82 and the inner side of the receptacle 77, and urges the receptacle 77, connecting tube 79 and receptacle 78 outwardly toward the inner end of the regulating screw 84. The receptacle 77 is slidably fitted within a housing 87 in the casing 56. The receptacles 77 and 78 and their connecting tube 79 are filled with a suitable expansible fluid, such as compressed air.

The drive shaft 70 is connected by a universal joint 88 to the forward end of a transmission shaft 90, while the rear end of said transmission shaft is connected by a universal joint 91 to the forward end of the wiper crankshaft 29.

The operation, uses and advantages of my invention are as follows:

My wiper is maintained in operation or out of operation by means of the regulating screw 84 on the dash of the automobile 3. Upon turning said screw to the right its threaded engagement with the bushing 85 draws the screw forwardly, so that its inner end will engage the outer side of the receptacle 78 and contract the same, whereupon fluid from said receptacle will be forced out through the tube 79 into the receptacle 77 and will expand said receptacle forwardly and project the stem 80 forwardly so that its inner end will engage the piston 65 and force said piston plunger 62, ball bearing 64 and auxiliary plunger 63 forwardly, whereupon the rear end of said auxiliary plunger will engage the forward end 52' of the hub 52 of the gripping member 44 and force said gripping member outwardly from the gripping member 45 against the tension of the spring 46, and release said gripping members 44 and 45 from the friction wheel 43, so that said wheel will not rotate said gripping members, sleeve 54 and pump gear 67, said friction wheel moving out of frictional contact with said gripping member 45 by reason of the normal slight longitudinal play of the shaft 47, thus preventing rotation of the pump gear 68, drive shaft 70, transmission shaft 90, crank shaft 29 and crank 30, and maintaining the wiper units 1 and 2 at rest and out of operation, as shown in Fig. 9 of the drawings.

To operate my wiper the regulating screw 84 is turned to the left until the screw, by its threaded engagement with the bushing 85 is drawn outwardly sufficiently to release the pressure of the auxiliary plunger 63 from the hub 52 of the clutch of gripping member 44 to allow the clutch spring 46 to move the gripping member 44 toward the gripping member 45 to grip the friction wheel 43 between said gripping members, the inward movement of the hub 52 of the gripping member 44 causing the end 52' of said hub to force said auxiliary plunger 63, plunger 62 and piston 65, and stem 80, receptacle 77, tube 79 and receptacle 78 outwardly. The gripping of the friction wheel 43 by the clutch gripping members 44 and 45 causes said wheel to rotate said gripping members, sleeve 54 and pump gear 67, and said pump gear to rotate the pump gear 68, drive shaft 70, transmission shaft 90, crankshaft 29 and crank 30. Rotation of the crank 30 causes said crank to draw the straps 35 and 36 to unwind said straps from the crank drums 11 of the wiper units 1 and 2 respectively, whereby the spring cranks 9 of said wiper units are swung in one direction, to swing the wiper bars 7, through the actuating rods 8, upwardly about the pivot guides 10 into a vertical position, and then move said wiper bars inwardly toward each other in a horizontal direction until said wiper bars are adjacent opposite sides of the windshield vertical frame member 92 at the center of the automobile, the engagement of the bends 26, in the actuating rods 8, with the guide rollers 25, producing said horizontal movement of said wiper bars. The rotation of the crank 30 continues and as the crank pins 33 and 34 pass their dead centers the crank springs 18 unwind and swing the cranks 9 in an outward direction, whereby the wiper bars 7, through actuating rods 8, are drawn outwardly in a horizontal direction and are then swung downwardly about the pivot guides 10, the engagement of the bends 26, in the actuating rods 8, with the guide rollers 25 producing said horizontal movement of said wiper bars.

The swinging movement of the wiper bars 7 about the pivot guides 10 causes the outer end of said bars to follow the streamline curvature of the outer sides of the windshield 5, and to wipe the outer portions of the windshield panels 4 and 6, while the horizontal movement of the wiper bars causes said bars to wipe the remaining straight inner portions of said panels, thus enabling the wiper bars to wipe the entire surface of said panels.

During operation of my wiper my governor 41 prevents the same from running above a predetermined speed. This is done by the oil pump 61, which normally pumps oil from its reservoir 73 through its inlet tube 74 and through its outlet tube 75 into the outer end of the cylinder 66 and through the groove 75' and outlet 76 back into said reservoir, but when the wiper is driven above a predetermined speed the force of the oil pumped by the pump through outlet tube 75 into the outer end of said cylinder 66 is increased and forces the piston 65, plunger 62, and auxiliary plunger 63 forwardly and the engagement of the forward end of said auxiliary plunger with the inner end of the hub 52 of gripping member 44 forces said gripping member forwardly away from the gripping member 45, whereupon said gripping members 44 and 45 release the friction wheel 43 and the driving mechanism and wiper slow down until the force of the oil pumped into the cylinder 66 by the pump 61 is reduced sufficiently to allow the spring 46 to move the gripping disk 44 toward the gripping disc 45 to grip the friction wheel 43 between said disks to enable said friction wheel to drive the wiper. The forward movement of the piston 65 and parts actuated thereby is limited by means of the outlet 76, which is uncovered when said piston is moved forward sufficiently by excessive pressure of the oil, whereupon the oil is pumped from the outlet tube 75 directly through the cylinder 66 and said outlet 76 back into the reservoir 73.

The diaphragms 77 and 78 expand, when the piston 65 is moved forwardly, to maintain the diaphragm 78 in contact with the screw 84 during said movement, so that the diaphragm 78 will always be in contact with said screw and will not strike against said screw when the piston 65 moves back to its initial position.

I claim:

In a windshield wiper, a wiper bar, a bracket to which said wiper bar is connected, a crank, an actuating rod connected at one end to said crank and to the other end of which is connected said bracket, a guide for said actuating rod comprising a disk turnably mounted below a windshield panel and a pair of rollers mounted on said disk, between which rollers said actuating rod extends, said rod being bent into such form that when said crank is oscillated and said rod is moved between said rollers said wiper bar is first swung from a horizontal position to a vertical position and then moved horizontally in one direction, then moved horizontally in the other direction and then swung from its vertical position down into a horizontal position for wiping said windshield panel.

LAWRENCE W. WATERS.